United States Patent [19]

Banks

[11] Patent Number: 4,776,780
[45] Date of Patent: Oct. 11, 1988

[54] DEVICE FOR REPAIR OF CRACKED WINDSHIELDS

[76] Inventor: Edward J. Banks, 4104 Winding Way Court, Dallas, Tex. 75252

[21] Appl. No.: 157,987

[22] Filed: Feb. 19, 1988

[51] Int. Cl.$^4$ ............................................... B29B 9/00
[52] U.S. Cl. ...................................... 425/12; 425/13; 156/94; 156/285; 249/83
[58] Field of Search ...................... 425/11–14, 425/405.1; 264/36, 102, 259; 156/94, 285, 286; 249/83

[56] References Cited

U.S. PATENT DOCUMENTS

| | | | |
|---|---|---|---|
| 3,765,975 | 10/1973 | Hollingsworth | 264/102 |
| 3,988,400 | 10/1976 | Luhman | 425/12 |
| 3,993,520 | 11/1976 | Werner et al. | 55/36 |
| 4,032,272 | 6/1977 | Miller | 425/12 |
| 4,047,863 | 9/1977 | McCluskey et al. | 264/36 |
| 4,280,861 | 7/1981 | Schwartz | 264/102 |
| 4,385,015 | 5/1983 | Klettke | 425/12 |

*Primary Examiner*—Bernard Nozick
*Attorney, Agent, or Firm*—Thomas L. Cantrell

[57] ABSTRACT

A shatterproof windshield repair device comprising a housing and a diaphragm. Under vacuum, air passages between the diaphragm and the glass surface form part of a first enclosure which can be evacuated and thus the device is held in place around conical cracks in the windshield. The vacuum in the first enclosure can be maintained by an assembly with a sealing capability. Surrounded by this first enclosure is a second enclosure which directly encircles the immediate area containing the conical cracks in the shatterproof windshield. A separate sealing lip, being part of the diaphragm, encircles this immediate area on the windshield and completely isolates the second enclosure from the first enclosure. In the center of the device is a cylindrical passage that axially extends from the exterior of the housing into the second enclosure. A piston assembly can move in and out of the cylindrical passage to introduce the repair liquid into the conical cracks in the shatterproof windshield.

11 Claims, 2 Drawing Sheets

DEVICE FOR REPAIR OF CRACKED WINDSHIELDS

BACKGROUND OF THE INVENTION

The present invention relates to a device for repairing, by the use of a chemical repair liquid, cracked shatterproof glass such as windshields on an automobile.

An autommobile windshield is made of shatterproof glass in that the glass contains three laminates: an outer glass lamination, an internal synthetic resin lamination which imparts the shatterproof characteristics, and an inner glass lamination. Although an automobile windshield is shatterproof, it readily forms conical cracks when it is hit by a rapidly moving small pebble or other object. Usually, these conical cracks are formed when a cone-shaped piece of glass is separated, or partially separated from the external glass lamination, creating an air cavity under the surface of this outer glass lamination. If un-repaired, the air in this cavity eventually expands, causing a separation or a cracking of the glass to make room for its expansion. The result is the requirement of replacing the whole windshield, a very expensive requirement.

The repair of conical cracks on windshields usually is accomplished by injecting a polymeric repair liquid into the air cavity of the damaged area. The repair liquid dries and hardens, either by itself or induced by other means. The surface of the glass at the repair site is then either leveled or leveled and polished. The conical cracks are, in effect, cured. The repair of an automobile windshield is definitely less expensive that the replacement of the whole windshield.

Windshield repair devices and repair methods have been patented in the U.S. The general principle is to inject a repair liquid into conical cracks by means of a device that can be positioned around the cracks on the windshield. The device is usually held in place by a partial vacuum environment. The partial vacuum environment also serves to evacuate the cracks so that the repair liquid can completely fill the cracks.

U.S. Pat. No. 4,047,863, issued to McCluskey et al., discloses an apparatus for repair of shatterproof glass by the introduction of a repair liquid into the damaged area. A vacuum is applied to an enclosure surrounding the damagd area. The vacuum is intermittently released, by introducing air into the evacuated area, and reapplied to the area. The vacuum not only holds the apparatus in place but also helps to fill the crack with the repair liquid.

Klettke U.S. Pat. No. 4,385,015 teaches a windshield repair device. The device comprises a vacuum cup with a built-in piston and cylinder assembly. The cylinder assembly has a transverse opening so that when the piston is partly withdrawn, gas bubbles can be drawn out of the repair liquid by the vacuum holding the cup in place against the glass. Afterward, the piston closes off repair liquid communication through the transverse opening in the cylinder and the piston is used to force the repair liquid into the damaged area. Thus the cylinder not only serves as a reservoir for repair liquid but also allows the vacuum environment in the cup to remove gas bubbles from the repair liquid.

U.S. Pat. No. 3,765,975 to Hollingsworth teaches a method of repairing a pockmarked safety glass windshield. The patent describes a cup-shaped body held tightly over the pockmark area and fitted with a movable pointed probe and a removable syringe. The body of the device is held in place by a supporting frame attached to the windshield by rubber suction cups. Again, the vacuum environment that held the body in place is in direct communication with the pockmark area.

Luhman U. S. Pat. No. 3,988,400 describes a method of repairing cracked windshields. The apparatus disclosed includes a frame supported by two pairs of suction cups which can be pressed against the outer face of the windshield to keep the frame in a fixed position straddling the crack spot. A flexible dam forms a reservoir for the repair liquid. A probe over the flexible dam is used to squeeze the repair liquid into the crack.

Miller U. S. Pat. No. 4,032,272 teaches a windshield repair device. The device evacuates the atmosphere in the first enclosure around the pockmark and also seals off the immediate area surrounding the pockmark. This first enclosure has two outlets connected to the exterior of the device. A second outer enclosure can be evacuated to hold the device in place. Air, however, can be introduced into this second enclosure by opening a vacuum connection. The repair liquid is forced under pressure into the damaged area in the first enclosure.

U.S. Pat. No. 3,993,520 to Werner et al. discloses a windshield repair apparatus and method. The device has an injector tub which is held by a bridge member. The bridge member is situated in a spaced relationship to the windshield and adjacent to the crack. The piston of the injector tub can be reversed to create a partial vacuum condition and is also used to force the repair liquid into the crack.

SUMMARY OF THE INVENTION

The present invention pertains to a device for the repair of conical cracks in a shatterproof glass of an automobile, utilizing a repair liquid injected into the cracks. The device has a diaphragm fitted to the base of a housing. air passages which are enclosed by the diaphragm and the glass surface provide part of the first enclosure which can be evacuated by a pump. Thus the device is held in place surrounding the cracks on the windshield. An assembly with a sealing capability will maintain the vacuum in this first enclosure intact. Accordingly, the pump can be removed from the device after a vacuum environment has been created in the first enclosure. Encircled by this first enclosure is a second enclosure which directly surrounds the immediate area containing the conical cracks in the shatterproof windshield. A separate sealing lip encircles this immediate area and compltely isolates the second enclosure from the first enclosure. A cylindrical passage extends axially from the exterior of the device into the second enclosure. A piston assembly, which is free to move in and out of the cylindrical passage, can pressurize or evacuate this second enclosure. This piston assembly is used to force the repair liquid into the conical cracks in the shatterproof windshield.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION OF THE PREFERRED EMBODIMENT

Figure 1:
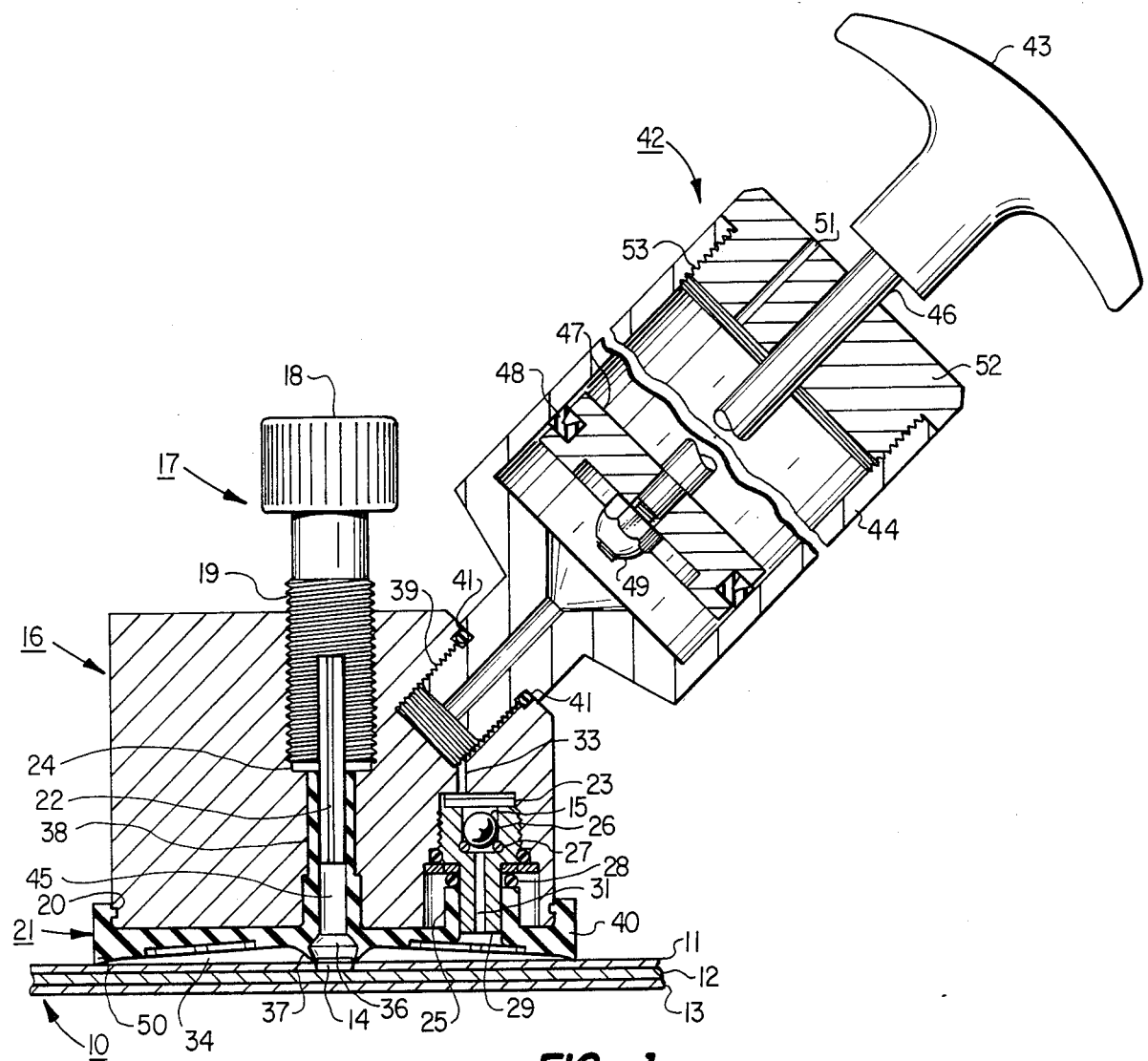
FIG. 1 is a cross-sectional diagrammatical representation of one embodiment of an apparatus in accordance with the present invention placed in place over a conical crack present in a piece of shatterproof glass of an automobile.

Referring first to FIG. 1, there is shown a cross sectional diagrammatical representation of one embodiment of an apparatus in accordance with the present invention postioned in place over a conical crack present in a piece of shatterproof glass of an automobile. typically, a shatterproof windshield 110 comprises an outer glass lamination 11 and an inner glass lamination 13 spaced from one another by an internal synthetic resin lamination 12. The lamination 12 is the layer that imparts the shatterproof characteristic to the windshield by preventing glass fragmentation when the windshield is struck by a flying object. Although the windshield is shatterproof, the glass will develop a conical crack 14 when it is hit by a flying small object such as a pebble.

The repair apparatus comprises a diaphragm 21 which is fitted under and around the base of the housing 16. Portion of this diaphragm 21, namely, the peripheral sleeve 40, wraps around the bottom side wall of the housing 16, and is held in place by a body groove 20. Center to this diaphragm 21 is a central sleeve projecting about halfway into the central passage 45, extending axially through a second enclosure 36. This central passage 45 is a cylindrical path that is open axially to the exterior of the housing 16. The central passage 45 is shown in the picture to be fitted by a plunger head 22 and plunger threads 19. The plunger threads end at seat 24. Threaded thereto is a knurled grip 18. In operation, an inner sealing lip 37 completely isolates the second enclosure 36 from the rest of the first enclosure 34. The peripheral sealing lip 50 completely encircles the first enclosure 34.

Still referring to FIG. 1, a side sleeve 25 tightly encircles the valve body-intake 29. To ensure positive vacuum seal, side sleeve 25 is provided with a side sleeve O-ring near the top of the side sleeve 25. A vacuum inlet 31 connects the first enclosure 34 to the enclosure assembly 15 which in turn is connected through the vacuum path 33 to an evactuating means. This vacuum path 33 leads into the hand pump 42, the evacuating means. The hand pump 42 is shown to be in threaded engagement with hand pump threads 39. An O-ring 41 helps to maintain the hand pump 42 tightly engaged to the housing 16. The hand pump 42 is shown fitted with a handle 43 connected to the piston hand 47 by means of piston rod 46 through the pump cover 52. The pump cover 52 is in threaded engagement with the pump barrel 44 through cover threads 53. At the end of the piston head 47 is a steel elastic lock nut 49. Piston seal 48 provides an air-tight engagement of the piston head 47 with the pump barrel 44.

As is shown in FIG. 1, housed in the enclosure assembly 15 is a steel ball 26 which sits on O-ring 27. The steel ball 26 can travel upward to reach steel roll pin 23 and let the air be pumped out from the first enclosure 34 by the hand pump 42 through vacuum path 33. When the first enclosure 34 is under vacuum, the vacuum created will drive the steel ball 26 to rest tightly onto the O-ring 27, creating a seal. Thus, the steel ball 26 and O-ring 27 will maintain the vacuum in the first enclosure 34 intact when the hand pump 42 is removed from the body 16.

Referring still to FIG. 1, it is seen that, in operation, the second enclosure 36 is placed over and around the conical crack 14 on the shatterproof windshield glass 10. The first enclosure 34 is evacuated with the hand pump 42. Because the steel ball 26 and O-ring 27 can maintain the vacuum in the first enclosure 34, hand pump 42 can be removed, by unscrewing, if necessary. Inner sealing lip 37 will isolate the second enclosure 36 from the surrounding first enclosure 34. Polymeric repair liquid can be introduced, by a syringe, into the central passage 45 which opens axially to the external of the housing 16. By moving the knurled grip 18 together with its plunger head 22 up and down the central passage 45, either a partial vacuum environment or a pressurized environment, respectively, can be created in the second enclosure 36. Thus, by the manipulation of the plunger head, the repair liquid can be forced into the conical crack 14. After manipulation of the plunger head and pressurized environment maintenance sufficient to allow complete filling of the air cavity (1 to 5 minutes), the plunger is removed. Excess repair liquid is then removed by a syringe. Then, the repair device can be removed from the shatterproof windshield glass 10 by rocking the whole housing 16 together with the diaphragm 21. The rocking motion will introduce air into the first enclosure 34 and thus terminates the vacuum condition in the first enclosure 34. The surface divot of the damage now can be leveled or polished to give a smooth look.

When air is evacuated from the first enclosure 34, there are four vacuum sealing points in the device: inner sealing lip 37; peripheral sealing lip 50; side sleeve O-ring 28; and pressing of steel ball 26 against O-ring 27.

Figure 2:
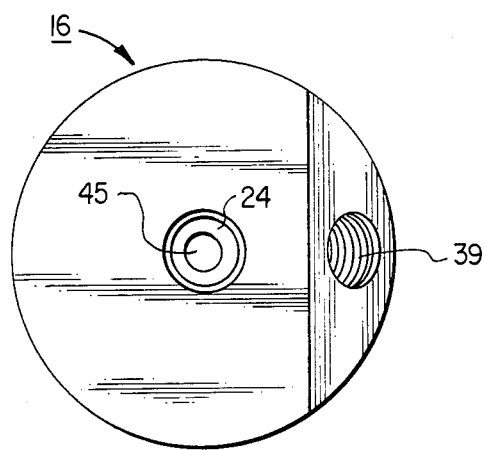
FIG. 2 is a top view of the housing of one embodiment of an apparatus in accordance with the present invention.

Referring now to FIG. 2, there is shown a top view of the housing 16 of one embodiment of an apparatus in accordance with the present invention. Axially through the center of the housing 16 is the central passage 45 connecting the second enclosure (not shown in the diagram) to the external of the housing 16. Also shown is a seat 24 where the plunger threads (also not shown) end and on which the plunger (also not shown in the diagram) rests. Hand pump threads 39 are shown at an angle to the body 16.

Figure 3:
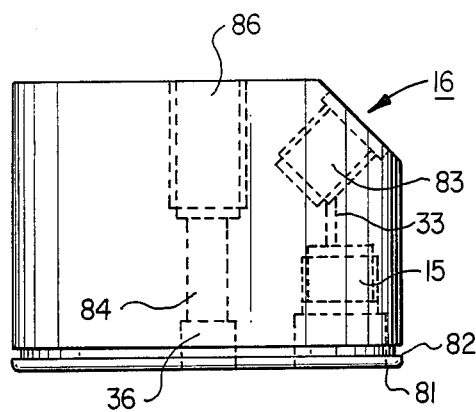
FIG. 3 is a side view of the housing of one embodiment of an apparatus in accordance with the present invention.

Referring now to FIG. 3, there is shown a side view of the housing 16 of one embodiment of an apparatus in accordance with the present invention. The internal structures of the housing 16 is shown by dotted lines. The diagram shows that in the center of the housing 16 is the plunger assembly housing 86, open axially to the external of the housing 16 and is connected to the plunger path 84 which in turn is in communication with the second enclosure 36. The plunger assembly housing 86 and the plunger path 84 collectively form the central passage 45 (not shown in the figure).

Still referring to FIG. 3, to the side of the housing 16, and at an angle, is a hand pump housing 83 which is connected to the enclosure assembly 15 through a vacuum path 33. This enclosure assembly 15 is in direct communication with the first enclosure 34, not shown in the diagram. Of course, the first enclosure 34 is formed only when the diaphragm 21 (not shown) engages the outer glass lamination 11 (not shown). The diaphragm 21 (not shown) completely encloses the base 81 and extends around portion of the side of the housing 16. The base neck 82 helps to hold the diaphragm 21 (not shown) in place.

Figure 4:
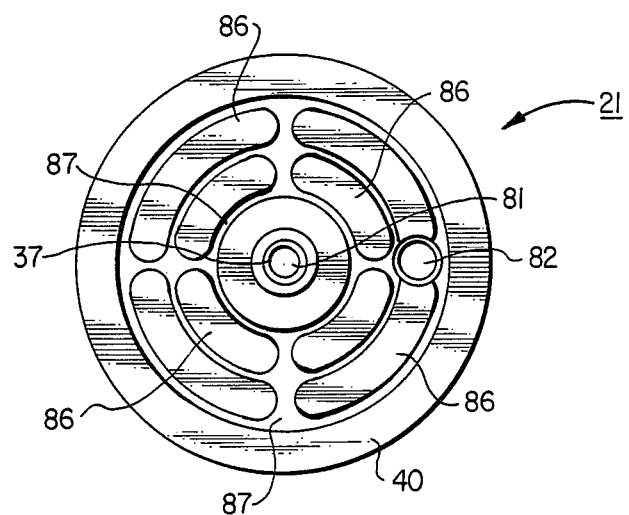
FIG. 4 is a bottom view of the diaphragm constructed in accordance with the present invention.

Referring now to FIG. 4, there is shown a bottom view of the diaphragm 21. The bottom side of the diaphragm 21 is the side that is in direct contact with the outer glass lamination 11 (not shown in the diagram). The diaphragm 21 is preferbly made of flexible and compressible rubber-like material. The peripheral sleeve 40 encircles the whole diaphragm 21, forming generally the first enclosure when the diaphragm 21 is in direct contact with the outer flass lamination under vacuum. In the center is shown the entry 81 to the central passage. The inner sealing lip 37 encircles this entry 81. To the side is an opening 82 for the insertion of the valve body-intake 29 (not shown). A plurality of ribs 86 are in direct contact with the outer glass lamination 11 (not shown) when the first enclosure is under vacuum. Air passages 87 are under vacuum when the repair unit is under operation. This vacuum holds the diaphragm 21 and the housing 16 (not shown) tightly in place so that the repair liquid can be introduced into the conical crack through the central passage 45 (also not shown).

It is thus believed that the operation and construction of the present invention will be apparent from the foregoing description. While the method and apparatus shown and described have been characterized as being preferred, it will be obvious that various changes and modifications may be made therein without departing from the spirit and scope of the invention as defined in the following claims.

What is claimed is:

1. Apparatus for the repair of cracks in glass such as windshields utilizing repair liquid injected into said cracks, said apparatus comprising:
    a. a housing adapted for engaging said glass and having a passage formed therethrough for receiving said repair liquid;
    b. means for engaging the glass and defining a first enclosure, said means comprising a diaphragm having a first peripheral sealing lip and a second inner sealing lip defining a first area of said first enclosure therebetween;
    c. means for evacuating said first enclosure for producing a vacuum therein, said evacuating means being removably attached thereto;
    d. means for maintaining said vacuum in said first enclosure when said evacuating means is removed;
    e. a second enclosure defined by said inner sealing lip and completely isolated from said first enclosure, said second enclosure being in flow communication with said passage; and
    f. a piston, movable within said passage, for pressurizing and evacuating said second enclosure.

2. An apparatus according to claim 1 in which said first peripheral sealing lip completely surrounds the peripheral of said diaphragm.

3. An apparatus according to claim 1 in which said second enclosure is in the center of said first enclosure.

4. An aapparatus according to claim 1 in which said passage is cylindrical and extends axially from the exterior of said housing to said second area immediately surrounding said cracks.

5. An apparatus according to claim 1 in which evacuating means for said first enclosure comprises a hand pump.

6. An apparatus according to claim 1 in which means for maintaining vacuum in said first enclosure comprises a steel ball situated between a steel roll pin and an O-shaped ring in an enclosure assembly connecting a vacuum inlet and vacuum path.

7. An apparatus according to claim 1 in which said diaphragm further comprises a plurality of arcuately shaped ribs in concentrically aligned relationship with said second inner sealing lip.

8. An apparatus according to claim 7 in which said diaphrgam further comprises a first peripheral sleeve, a second central sleeve and a third side sleeve.

9. Apparatus for the repair of cracks in glass such as windshields utilizig repair liquid injected into said cracks, said apparatus comprising:
    a. a generally cylindrical housing adapted for engaging said glass and having a central passage formed therethrough for receiving said repair liquid;
    b. a base on said housing having a neck region formed therearound, said central passage extending axially from the exterior of said housing through said base;
    c. means for engaging the glass and defining a first enclosure, said means comprising a diaphragm encapsulating said base having a first peripheral sealing lip and a second inner sealing lip defining a first area of said first enclosure therebetween;
    d. means for evacuating said first enclosure for producing a vacuum therein, said evacuating means being removably attached thereto;
    e. a one-way valve disposed in said housing adjacent said base for one-way flow communication with said evacuating means;
    f. a second enclosure defined by said inner sealing lip and completely isolated from said first enclosure, said second enclosure being in flow communication with said central passage; and
    g. a piston movable with said central passage for pressurizing and evacuating said second enclosure.

10. An apparatus according to claim 9 in which said on-way flow communication is accomplished by an enclosure assembly comprising a steel ball situated between an O-shaped ring and a steel roll pin in said enclosure assembly connecting said vacuum inlet and said vacuum path.

11. An apparatus according to claim 9 in which said circular diaphragm further comprises:
    a. a plurality of arcuately shaped ribs in concentrically aligned relationships about said second inner sealing lip;
    b. a first peripheral sleeve encircling shoulder of said base;
    c. a second central sleeve projecting into said central passage; and
    d. a third sleeve encircling said one-way valve, said third side sleeve comprises an O-shaped ring around the top of said side sleeve.

* * * * *